UNITED STATES PATENT OFFICE.

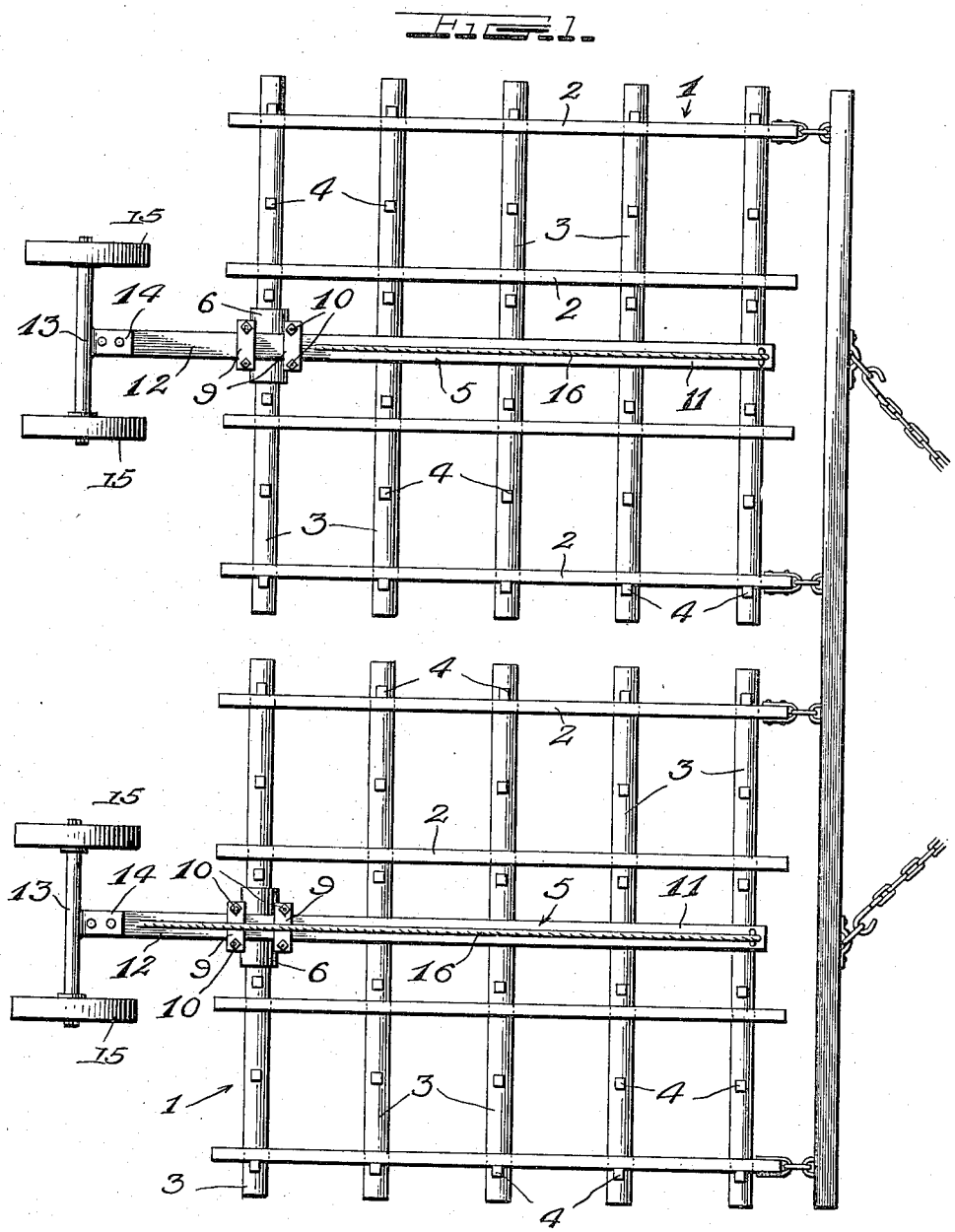

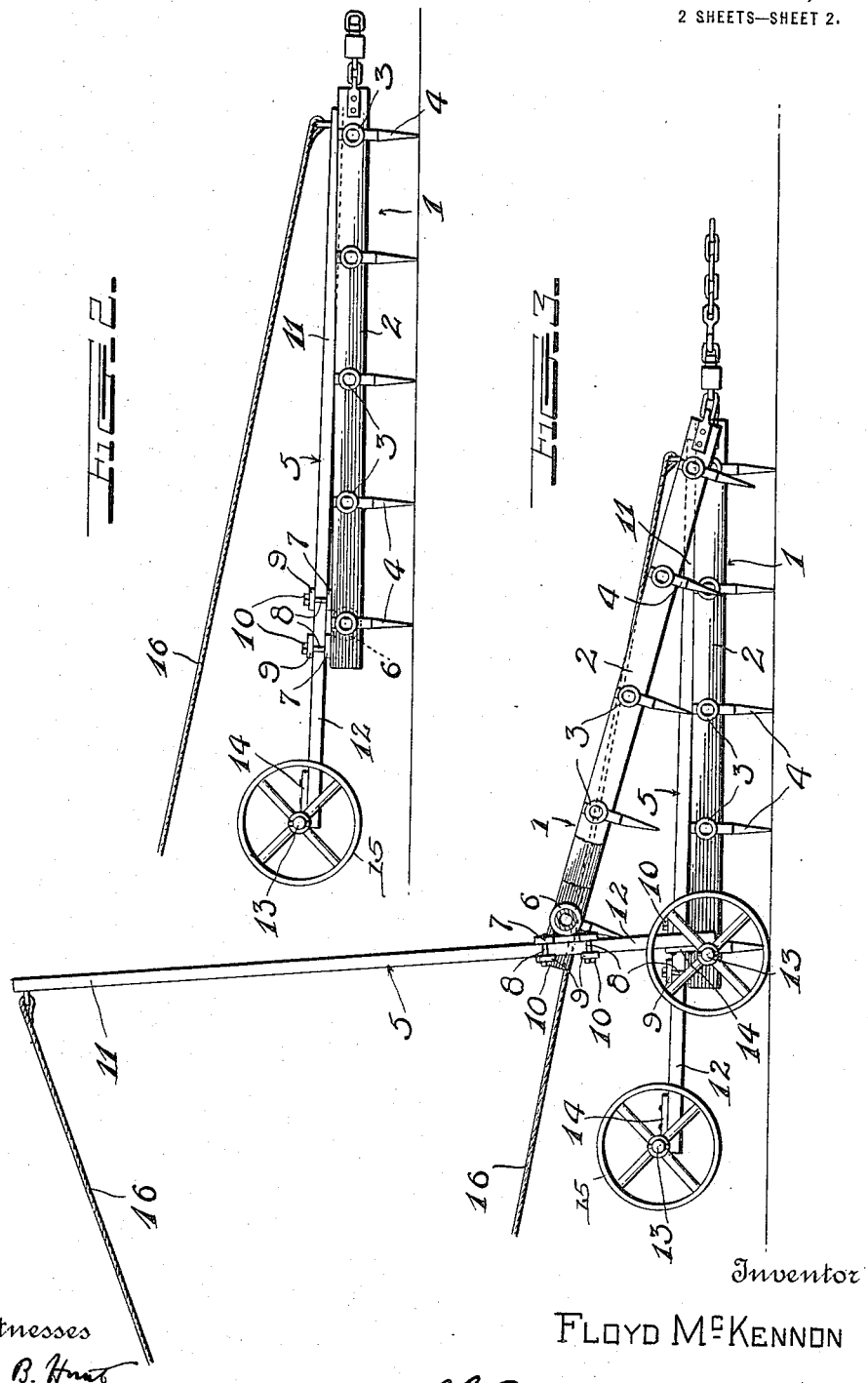

FLOYD McKENNON, OF LA GRANDE, OREGON.

CLEANING MEANS FOR HARROWS.

1,172,149.  Specification of Letters Patent.  Patented Feb. 15, 1916.

Application filed July 16, 1915. Serial No. 40,269.

*To all whom it may concern:*

Be it known that I, FLOYD McKENNON, a citizen of the United States, residing at La Grande, in the county of Union and State of Oregon, have invented certain new and useful Improvements in Cleaning Means for Harrows; and I do declare the following to be a full, clear, and exact description of the invention, such as will enable others skilled in the art to which it appertains to make and use the same.

My invention relates broadly to improvements in agricultural implements, and more particularly to cleaning devices for harrows, the object of the invention being to provide an extremely simple means whereby the harrow may be raised from contact with the earth without stopping the draft animals, and whereby, in case of a sectional harrow, any one of the sections may be raised independently of the others, thus allowing any litter which may have accumulated beneath the harrow to fall to the earth.

With this general object in view, the invention resides in certain novel features of construction and in unique combinations of parts hereinafter fully described and claimed.

In describing the invention, I shall refer to the accompanying drawings wherein like reference characters designate corresponding parts throughout the several views, and wherein:

Figure 1 is a top plan view of a sectional harrow equipped with the invention; Fig. 2 is a side elevation of the harrow in working position; and Fig. 3 is a similar view showing one section of the harrow swung upwardly.

In the embodiment illustrated in these drawings, the numerals 1 designate two sections of a sectional harrow each of which comprises a plurality of longitudinally disposed bars 2, and transverse bars 3 secured against movement in respect to the bars 1 in any suitable manner and carrying the usual harrow teeth 4. It is well known that when using harrows of the type just briefly described, the teeth thereof become clogged with litter from the field being harrowed, and such clogging often necessitates that the team be stopped in order that the harrows may be cleaned before the work can be effectively accomplished. This operation of course requires considerable time and is exceedingly arduous, especially if the harrow be of very heavy construction. My invention therefore aims to provide simple means whereby the harrows may be dumped simply by pulling rearwardly upon a cable or the like. To this end, a longitudinally disposed lever 5 is fulcrumed at the rear end of each harrow section 1, said levers being shown in the present application as provided with transverse tubular bearings 6 having forwardly and rearwardly extending flanges 7 which contact with the lower sides of the levers and receive clamping bolts 8 whose ends are passed through clamping plates 9 which overlie the levers 5, the usual nuts 10 being threaded on the bolts 8.

The tubular bearings 6 are shown in the present application of the invention as mounted upon the rear bars 3 of the frame sections 1, but it will be evident that the levers might be fulcrumed by other means, it being essential, however, that they be fulcrumed between their ends and that the forwardly extending arms 11 of said levers be of greater length than the rearwardly projecting arms 12, thereby providing necessary leverage to be exerted in a manner to be set forth.

Carried by the rear ends of the levers 5, are the transverse axles 13, such axles being preferably though not necessarily formed integrally with attaching plates 14 which are bolted or otherwise secured to the levers. The opposite ends of the axle 13 are provided with supporting wheels 15 which do not travel upon the earth when the harrow is in operation as clearly shown in Fig. 2, such wheels being then disposed in rear of the harrow sections. When, however, it is necessary to raise such sections, the levers 5 are shifted to the upright position shown in Fig. 3, thereby raising the harrow sections clear of the earth.

In order to dispose the levers 5 to upright position for the reasons above set forth, it is necessary to pull the front or power arms 11 of said levers rearwardly. For this purpose, although practically any preferred means may be provided, the independent cables 16 are preferably connected at their front ends to the front ends of said arms 11, while their rear ends are so positioned as to be readily grasped by the driver who may be walking behind the harrow or riding in a cart or sulky as is commonly done. By so disposing the cables 16, it will be evident that any of the harrow sections 1 may be dumped independently of the other sections, or that all sections may be dumped simultaneously, thereby allowing the entire harrow to be kept in such condition as to produce the best results.

From the foregoing description, taken in connection with the accompanying drawings, the construction and operation of the device will be readily understood to those skilled in the art to which the invention relates, further description or exposition being therefore deemed superfluous.

In the drawing, certain specific details of construction have been shown for accomplishing probably the best results, and in the preceding such details have been described, but it will be evident that I need not be restricted thereto otherwise than to the extent to which the appended claims limit me.

I claim:

1. The combination with a harrow, of a longitudinally disposed lever fulcrumed between its ends thereon, and an operating element leading rearwardly from the front end of said lever, whereby the latter may be rocked to dispose its rear end downwardly, thus forcing the harrow upwardly.

2. The combination with a harrow, of a longitudinally disposed lever fulcrumed between its ends thereon, and having a truck member on its rear end, and an operating element leading rearwardly from the front end of the lever, whereby the latter may be rocked to dispose its rear end downwardly, thus raising the harrow.

3. The combination with a harrow comprising a plurality of independently movable sections, of a longitudinally disposed lever fulcrumed between its ends on each of said sections, an independent operating element leading rearwardly from the front ends of the levers, whereby the latter may be so rocked as to dispose their rear ends downwardly, thus raising the harrow sections.

4. The combination with a harrow comprising a plurality of independently movable sections, of a longitudinally disposed lever fulcrumed between its ends on each section, truck members on the rear ends of said levers, and operating elements leading rearwardly from the front ends thereof, whereby the said levers may be so rocked as to dispose their rear ends downwardly, thus raising the harrow sections.

In testimony whereof I have hereunto set my hand in presence of two subscribing witnesses.

FLOYD McKENNON.

Witnesses:
 TURNER OLIVER,
 D. A. BODMER.

Copies of this patent may be obtained for five cents each, by addressing the "Commissioner of Patents, Washington, D. C."